(12) United States Patent
Zhou et al.

(10) Patent No.: US 9,959,861 B2
(45) Date of Patent: May 1, 2018

(54) SYSTEM AND METHOD FOR SPEECH RECOGNITION

(71) Applicant: Robert Bosch GmbH, Stuttgart (DE)

(72) Inventors: Zhengyu Zhou, Fremont, CA (US); Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/281,973

(22) Filed: Sep. 30, 2016

(65) Prior Publication Data

US 2018/0096678 A1 Apr. 5, 2018

(51) Int. Cl.
*G10L 15/01* (2013.01)
*G10L 15/22* (2006.01)
*G10L 15/10* (2006.01)
*G10L 15/08* (2006.01)

(52) U.S. Cl.
CPC ............. *G10L 15/01* (2013.01); *G10L 15/08* (2013.01); *G10L 15/22* (2013.01); *G10L 15/10* (2013.01); *G10L 2015/088* (2013.01); *G10L 2015/223* (2013.01)

(58) Field of Classification Search
CPC ....................................................... G10L 15/32
See application file for complete search history.

(56) References Cited

U.S. PATENT DOCUMENTS

| | | | | |
|---|---|---|---|---|
| 8,126,839 B2* | 2/2012 | Chen | ................... | G06F 17/3053 702/19 |
| 8,271,408 B2* | 9/2012 | Sellamanickam | ........................ | G06F 17/30707 706/12 |
| 9,384,734 B1* | 7/2016 | Wiseman | ................ | G10L 15/26 |
| 2009/0132237 A1* | 5/2009 | Gugenheim | .......... | G10L 15/187 704/10 |
| 2010/0191530 A1* | 7/2010 | Nakano | ................... | G10L 15/32 704/244 |
| 2013/0238336 A1* | 9/2013 | Sung | ....................... | G10L 15/32 704/255 |
| 2013/0346078 A1* | 12/2013 | Gruenstein | ............. | G10L 15/26 704/235 |
| 2014/0163959 A1* | 6/2014 | Hebert | ................ | G06F 17/2785 704/9 |
| 2014/0278390 A1* | 9/2014 | Kingsbury | .......... | G10L 15/1822 704/232 |

(Continued)

*Primary Examiner* — Brian L Albertalli
(74) *Attorney, Agent, or Firm* — Maginot Moore & Beck LLP

(57) ABSTRACT

A method for automated speech recognition includes generating first and second pluralities of candidate speech recognition results corresponding to audio input data using a first general-purpose speech recognition engine and a second domain-specific speech recognition engine, respectively. The method further includes generating a third plurality of candidate speech recognition result including a plurality of words included in one of the first plurality of speech recognition results and at least one word included in another one of the second plurality of speech recognition results, ranking the third plurality of candidate speech recognition results using a pairwise ranker to identify a highest ranked candidate speech recognition result, and operating the automated system using the highest ranked speech recognition result as an input from the user.

10 Claims, 4 Drawing Sheets

(56) References Cited

U.S. PATENT DOCUMENTS

| | | | | |
|---|---|---|---|---|
| 2014/0337032 A1* | 11/2014 | Aleksic | .................. | G10L 15/32 |
| | | | | 704/257 |
| 2015/0325236 A1* | 11/2015 | Levit | ....................... | G10L 15/18 |
| | | | | 704/240 |
| 2015/0348539 A1* | 12/2015 | Yamamuro | ............. | G10L 15/26 |
| | | | | 704/251 |
| 2017/0193387 A1* | 7/2017 | Lavallee | ................. | G06F 17/28 |

* cited by examiner

SYSTEM AND METHOD FOR SPEECH RECOGNITION

FIELD

This disclosure relates generally to the field of automated speech recognition and, more specifically, to systems and methods that improve the operation of speech recognition systems that utilize multiple speech recognition engines.

BACKGROUND

Automated speech recognition is an important technique to implement human machine interfaces (HMIs) in a wide range of applications. In particular, speech recognition is useful in situations where a human user needs to focus on performing a task where using traditional input devices such as a mouse and keyboard would be inconvenient or impractical. For example, in-vehicle "infotainment" systems, home automation systems, and many uses of small electronic mobile devices such as smartphones, tablets, and wearable computers can employ speech recognition to receive speech commands and other input from a user.

Most prior art speech recognition systems use a trained speech recognition engine to convert recorded spoken inputs from a user into digital data that is suitable for processing in a computerized system. Various speech engines that are known to the art perform natural language understanding techniques to recognize the words that the user speaks and to extract semantic meaning from the words to control the operation of a computerized system.

In some situations, a single speech recognition engine is not necessarily optimal for recognizing speech from a user while the user performs different tasks. Prior art solutions attempt to combine multiple speech recognition systems to improve the accuracy of speech recognition including selecting low-level outputs from the acoustic models different speech recognition models or selecting entire sets of outputs from different speech recognition engines based on a predetermined ranking process. However, the prior art techniques that pick outputs from different speech recognition engines are often unsuitable for use in specific tasks where a user often employs some speech from a natural language but combines the natural language speech commands with words and sentences that are used for a specific purpose. For example, in an in-vehicle infotainment system the speech input from a vehicle operator can include a natural language such as English or Chinese combined with specific words and phrases that are not well recognized by speech recognition engines, and merely selecting the outputs of different speech recognition engines that each include errors at a high rate of probability does not increase the overall accuracy of speech recognition. Furthermore, existing speech recognition systems that combine only low-level outputs such as the acoustic model outputs or other low-level features from multiple speech recognition engines cannot evaluate the outputs of different speech recognition engines using higher-level linguistic features. Consequently, improvements to the operation of automated systems to increase the accuracy of speech recognition using multiple speech recognition engines would be beneficial.

SUMMARY

In one embodiment, a method for performing speech recognition using hybrid speech recognition results has been developed. The method includes generating, with an audio input device, audio input data corresponding to speech input from a user, generating, with a controller, a first plurality of candidate speech recognition results corresponding to the audio input data using a first general-purpose speech recognition engine, generating, with the controller, a second plurality of candidate speech recognition results corresponding to the audio input data using a first domain-specific speech recognition engine, generating, with the controller, a third plurality of candidate speech recognition results, each candidate speech recognition result in the third plurality of candidate speech recognition results including a plurality of words included in one of the first plurality of candidate speech recognition results and at least one word included in another one of the second plurality of candidate speech recognition results, ranking, with the controller, at least the third plurality of speech recognition results using a pairwise ranker to identify a highest ranked candidate speech recognition result, and operating, with the controller, the automated system using the highest ranked candidate speech recognition result as an input from the user.

In another embodiment, an automated system that performs speech recognition using hybrid speech recognition results has been developed. The system includes an audio input device configured to generate audio input data corresponding to speech input from a user and a controller operatively connected to the audio input device and a memory. The controller is configured to receive the audio input data from the audio input device, generate a first plurality of candidate speech recognition results corresponding to the audio input data using a first general-purpose speech recognition engine, generate a second plurality of candidate speech recognition results corresponding to the audio input data using a first domain-specific speech recognition engine, generate a third plurality of candidate speech recognition results, each candidate speech recognition result in the third plurality of candidate speech recognition results including a plurality of words included in one of the first plurality of candidate speech recognition results and at least one word included in another one of the second plurality of candidate speech recognition results, rank at least the third plurality of candidate speech recognition results using a pairwise ranker to identify a highest ranked candidate speech recognition result, and operate the automated system using the highest ranked candidate speech recognition result as an input from the user.

DETAILED DESCRIPTION

Figure 1:
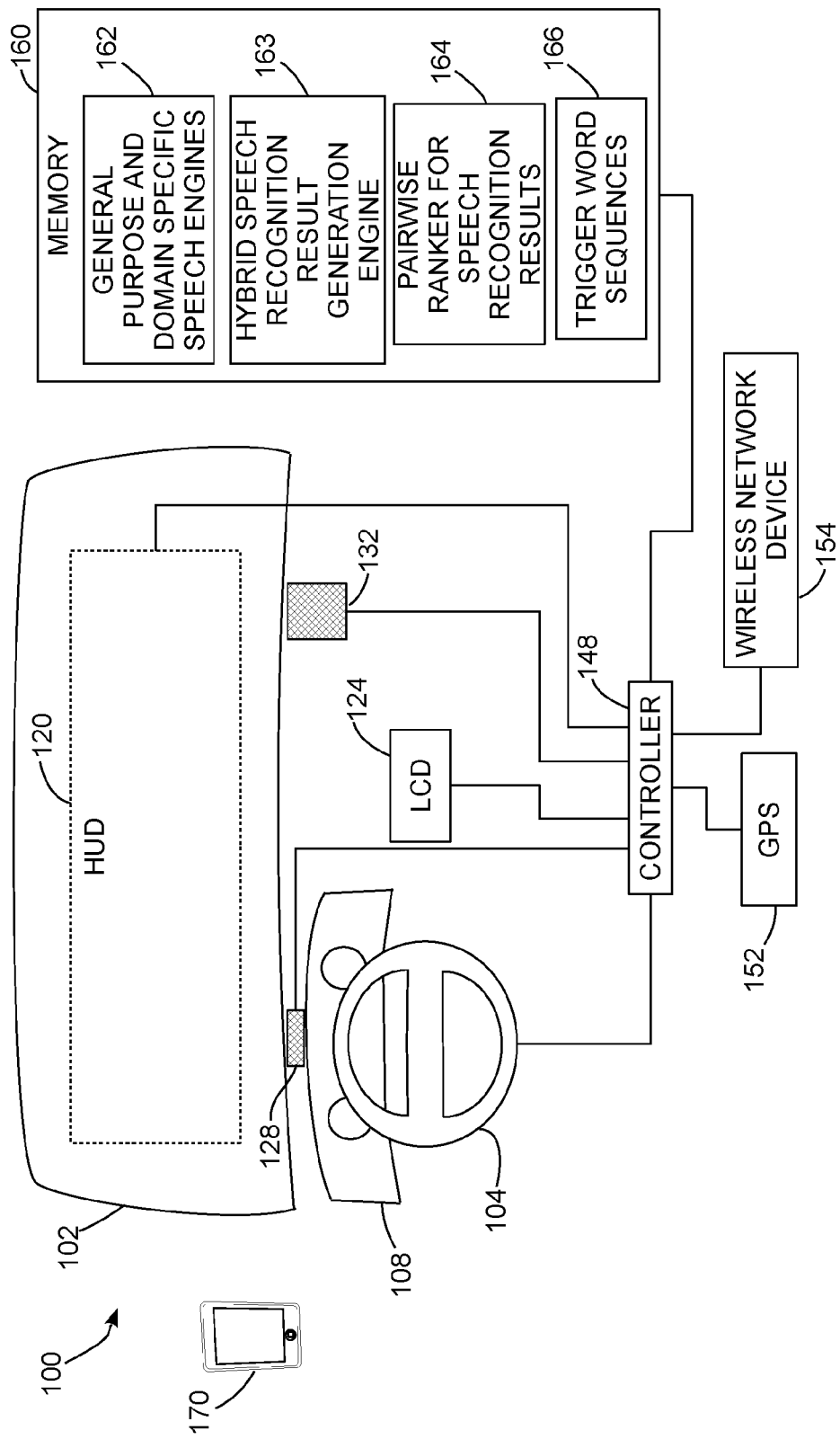
FIG. 1 is a schematic view of components of a computerized system that receives speech input commands from a user as embodied in an in-vehicle information system in a passenger compartment of a vehicle.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "speech recognition engine" refers to a data model and executable program code that enable a computerized system to identify spoken words from an operator based on recorded audio input data of the spoken words that are received via a microphone or other audio input device. Speech recognition systems often include a lower-level acoustic model that recognizes the individual sounds of human speech in a sound recording and higher-level language models that recognize words and sentences based on sequences of the sounds from the acoustic model for a predetermined language. Speech recognition engines that are known to the art typically implement one or more statistical models such as, for example, a hidden Markov model (HMM), support vector machine (SVM), trained neural network, or another statistical model that generates statistical predictions for recorded human speech using a plurality of trained parameters that are applied to a feature vector of input data that corresponds to the human speech. The speech recognition engine generates the feature vector using, for example, various signal processing techniques that are known to the art that extract properties ("features") of the recorded speech signal and organize the features into a one-dimensional or multi-dimensional vector that can be processed using the statistical model to identify various parts of speech including individual words and sentences. Speech recognition engines can produce results for speech inputs corresponding to individual spoken phonemes and more complex patterns of sounds including spoken words and sentences that include sequences of related words.

As used herein, the term "speech recognition result" refers to a machine-readable output that the speech recognition engine generates for a given input. The result can be, for example, text encoded in a machine-readable format or another set of encoded data that serve as inputs to control the operation of an automated system. Due to the statistical nature of speech recognition engines, in some configurations the speech engine generates multiple potential speech recognition results for a single input. The speech engine also generates a "confidence score" for each speech recognition result, where the confidence score is a statistical estimate of the likelihood that each speech recognition result is accurate based on the trained statistical model of the speech recognition engine. As is described in more detail below, a hybrid speech recognition system uses speech recognition results that are produced by multiple speech recognition engines, generates additional hybrid speech recognition results, and finally produces at least one output speech recognition result based on the plurality of previously generated speech recognition results. As used herein, the term "candidate speech recognition result" or more simply "candidate result" refers to a speech recognition result that is a candidate to be the final speech recognition result from the hybrid speech recognition system that produces multiple candidate results and selects only a subset (typically one) of the results as the final speech recognition result. In various embodiments, candidate speech recognition results include both the speech recognition results from general-purpose and domain-specific speech recognition engines and hybrid speech recognition results that the system 100 generates using words from multiple candidate speech recognition results.

As used herein, the term "general-purpose speech recognition engine" refers to a type of speech recognition engine that is trained to recognize a broad range of speech from a natural human language such as English or Chinese. The general-purpose speech recognition engines generate speech recognition results based on a broad vocabulary of trained words and trained grammatical models that correspond to widely used speech patterns in a natural language. As used herein, the term "domain-specific speech recognition engine" refers to a type of speech recognition engine that is trained to recognize speech inputs in a particular area of use or "domain" that often includes a somewhat different vocabulary and potentially different expected grammatical structures from broader natural languages. The vocabulary for a specific domain typically includes some terms from a broader natural language but may include a narrower overall vocabulary and in some instances includes specialized terms that are not officially recognized as official words in a natural language but are well-known to a particular domain. For example, in a navigation application a domain-specific speech recognition may recognize terms for roads, towns, or other geographic designations that are not typically recognized as proper names in a more general language. In other configurations, a particular domain uses a particular set of jargon that is useful for a particular domain but may not be well recognized in a broader language. For example, aviators officially use English as a language for communication but also employ a large number of domain-specific jargon words and other abbreviations that are not part of Standard English.

As used herein, the term "trigger pair" refers to two words, each of which can either be a word (e.g., "play") or a predetermined class (e.g., <Song Name>) representing a word sequence (e.g., "Poker Face") that falls within the predetermined class, such as the proper name of a song, person, location name, etc. Words in the trigger pair that, when appearing in a specific order within words in the sentence text content of a speech recognition result, have a high level of correlation between the appearance of a later word B in situations where an earlier word A is observed in audio input data for a trigger pair of A→B. In many instances a trigger pair includes two words in a trigger pair although a trigger pair can include a sequence with more than two words. As described in more detail below, after identification of a set of trigger pairs via a training process, the occurrences of trigger word pairs in the text of candidate speech recognition results forms a portion of a feature vector for each candidate result that a ranking process uses to rank different candidate speech recognition results.

FIG. 1 depicts an in-vehicle information system 100 that includes a head-up display (HUD) 120, one or more console LCD panels 124, one or more input microphones 128, and one or more output speakers 132. The LCD display 124 and HUD 120 generate visual output responses from the system 100 based, at least in part, upon speech input commands that the system 100 receives from an operator or other occupant of the vehicle. A controller 148 is operatively connected to each of the components in the in-vehicle information system 100. In some embodiments, the controller 148 connects to or incorporates additional components, such as a global positioning system (GPS) receiver 152 and wireless network device 154, to provide navigation and communication with external data networks and computing devices.

In some operating modes, the in-vehicle information system 100 operates independently, while in other operating modes, the in-vehicle information system 100 interacts with a mobile electronic device, such as a smartphone 170, tablet, notebook computer, or other electronic device. The in-vehicle information system communicates with the smartphone 170 using a wired interface, such as USB, or a wireless interface such as Bluetooth. The in-vehicle information system 100 provides a speech recognition user interface that enables the operator to control the smartphone 170 or another mobile electronic communication device using spoken commands that reduce distraction while operating the vehicle. For example, the in-vehicle information system 100 provides a speech interface to enable the vehicle operator to make phone calls or send text messages with the smartphone 170 without requiring the operator to hold or look at the smartphone 170. In some embodiments, the smartphone 170 includes various devices such as GPS and wireless networking devices that complement or replace the functionality of devices that housed in the vehicle.

The microphone 128 generates audio data from spoken input received from the vehicle operator or another vehicle passenger. The controller 148 includes hardware, such as DSPs, which process the audio data, and software components to convert the input signals from the microphone 128 into audio input data. As set forth below, the controller 148 uses at least one general-purpose and at least one domain-specific speech recognition engine to generate candidate speech recognition results based on the audio input data and the controller 148 further uses a pairwise ranker to improve the accuracy of the final speech recognition result output. Additionally, the controller 148 includes hardware and software components that enable generation of synthesized speech or other audio output through the speakers 132.

The in-vehicle information system 100 provides visual feedback to the vehicle operator using the LCD panel 124, the HUD 120 that is projected onto the windshield 102, and through gauges, indicator lights, or additional LCD panels that are located in the dashboard 108. When the vehicle is in motion, the controller 148 optionally deactivates the LCD panel 124 or only displays a simplified output through the LCD panel 124 to reduce distraction to the vehicle operator. The controller 148 displays visual feedback using the HUD 120 to enable the operator to view the environment around the vehicle while receiving visual feedback. The controller 148 typically displays simplified data on the HUD 120 in a region corresponding to the peripheral vision of the vehicle operator to ensure that the vehicle operator has an unobstructed view of the road and environment around the vehicle.

As described above, the HUD 120 displays visual information on a portion of the windshield 120. As used herein, the term "HUD" refers generically to a wide range of head-up display devices including, but not limited to, combined head up displays (CHUDs) that include a separate combiner element, and the like. In some embodiments, the HUD 120 displays monochromatic text and graphics, while other HUD embodiments include multi-color displays. While the HUD 120 is depicted as displaying on the windshield 102, in alternative embodiments a head up unit is integrated with glasses, a helmet visor, or a reticle that the operator wears during operation.

The controller 148 includes one or more integrated circuits configured as a central processing unit (CPU), microcontroller, field programmable gate array (FPGA), application specific integrated circuit (ASIC), digital signal processor (DSP), or any other suitable digital logic device. The controller 148 also includes a memory, such as a solid state or magnetic data storage device, that stores programmed instructions for operation of the in-vehicle information system 100.

During operation, the in-vehicle information system 100 receives input requests from multiple input devices, including speech input commands that are received through the microphone 128. In particular, the controller 148 receives audio input data corresponding to speech from a user via the microphone 128.

The controller 148 includes one or more integrated circuits configured as a central processing unit (CPU), microcontroller, field programmable gate array (FPGA), application specific integrated circuit (ASIC), digital signal processor (DSP), or any other suitable digital logic device. The controller 148 is also operatively connected to a memory 160, such as a solid state or magnetic data storage device, that stores programmed instructions for operation of the in-vehicle information system 100. The memory 160 stores model data and executable program instruction code to implement at least one general-purpose speech recognition engine and at least one domain-specific speech recognition engine 162, a hybrid speech recognition result generation engine 163, a pairwise ranker 164 that ranks the candidate speech recognition results from the speech recognition engines 162 and the candidate hybrid speech recognition results from the hybrid speech recognition result generation engine 163, and a plurality of predetermined trigger pairs 166 that the pairwise ranker 164 uses as part of the ranking process. The speech recognition engines 162 are trained using a predetermined training process and the speech recognition engines 162 are otherwise known to the art. While the embodiment of FIG. 1 includes elements that are stored within the memory 160 of the system 100 within a motor vehicle, in some embodiments an external computing device, such as a network connected server, implements some or all of the features that are depicted in the system 100. Thus, those of skill in the art will recognize that any reference to the operation of the system 100 including the controller 148 and the memory 160 should further include the operations of server computing devices and other distributed computing components in alternative embodiments of the system 100.

In the embodiment of FIG. 1, the hybrid speech recognition result generation engine 163 generates additional speech recognition that include words from at least two different sets of speech recognition results that the speech recognition engines 162 produce during operation of the system 100. As described in more detail below, the hybrid speech recognition result generation engine 163 combines words from the speech recognition results of the general-purpose speech recognition engines with selected words from the domain-specific speech recognition results to produce new speech recognition results that are not produced by any of the individual speech recognition engines 162. As used herein, the term "hybrid" speech recognition result refers to a speech recognition result that includes words from at least two of the speech recognition results that are produced by the general-purpose and domain-specific speech recognition engines 162. The hybrid speech recognition result generation engine 163 is not a traditional speech recognition engine. Instead, the hybrid speech recognition result generation engine 163 use language models to identify words from the domain-specific speech recognition results that are linguistically significant in the domain-specific speech recognition domain and use the words from the domain-specific speech recognition results to replace words in the speech recognition results from the general-purpose speech recognition engines. The hybrid speech recognition result generation engine 163 also generates a confidence score for each hybrid speech recognition result as an average of the confidence scores from the speech recognition engines 162 for each of the original speech recognition results that form the hybrid result.

The pairwise ranker 164 is a random forest pairwise ranker that is trained using the same sets of training data that are used to train the speech recognition engines 162. However, the pairwise ranker 164 is not a traditional speech recognition engine. Instead, the pairwise ranker is trained to rank the candidate speech recognition results of the speech recognition engines 162 and the candidate hybrid speech recognition results from the hybrid speech recognition result generation engine 163 using a pairwise ranking process that selects one speech recognition result in a pair of input speech recognition results that has the lowest estimated word error rate as a "winner" for each pair combination of speech recognition results. During the training process, the pairwise ranker 164 is trained to rank speech recognition results based on feature vector inputs that correspond to each candidate speech recognition result to estimate a word error rate, with the speech recognition input having the lowest estimated word error rate for a given pair being the "winner". The pairwise ranker is trained using different speech recognition results using the training inputs with predetermined correct values as a baseline to make estimates about the accuracy of the speech recognition results from the multiple speech recognition engines 162. In some embodiments, the pairwise ranker 164 is also trained using additional data from the speech recognition results such as feature vectors that identify the predetermined trigger pairs 166 and confidence scores that each of the speech recognition engines 162 produces with the speech recognition results. Additionally, as is described below the controller 148 generates hybrid speech recognition results that replace selected words in the results of the general-purpose speech recognition engines with words from the results of the domain-specific speech recognition engines to produce a plurality of hybrid speech recognition results that the pairwise ranker 164 uses as inputs.

For example, given the feature vectors that are generated for two candidate speech recognition results h1 and h2 as inputs, the controller 148 executes the pairwise ranker 164 to generate an a first "positive" output, meaning h1 wins, if the feature vector input for h1 has a lower estimate word error rate than h2, which indicates that h1 is "better" than h2. Otherwise, the pairwise ranker 164 generates a second "negative" output to indicate that the estimate word error rate of h2 is lower than h1. After processing every pair of candidate speech recognition results, the system 100 identifies the candidate speech recognition result with the greatest number of wins from the pairwise ranker 164 as the highest ranked candidate speech recognition result. For example, for a hypothesis list "h1, h2, h3", if h2 wins in the hypothesis pair (h1, h2), h1 wins in (h1, h3) and h2 wins in (h2, h3), h1, h2, h3 win 1 time, 2 times, and 0 times, respectively. Since h2 wins the largest number of times, the system 100 identifies h2 as the highest ranked candidate speech recognition result. Alternative embodiments of the pairwise ranker 164 use other classification techniques instead of the Random Forest approach to rank the candidate speech recognition results. In some embodiments, the pairwise ranker 164 is also trained using other classification features, such as the confidence score related feature and the "bag-of-words with decay" related features, in addition to the trigger pair related features. The confidence score related features are computed based on the sentence-level confident scores of the candidate hypotheses using certain approach.

In the list of candidate sentence hypotheses generated in Step1 of the pairwise ranker 164, those hypotheses that are the original recognition results from the speech recognition engines have sentence-level confidence scores that each of the speech recognition engines 162 produces with the speech recognition results, and the confidence scores for the hybrid speech recognition results. The "bag-of-words with decay" related features are computed based on the text content (i.e., word sequences) of the candidate hypotheses.

In the system 100, the trigger pairs 166 each include a predetermined set of two or more words that have been previously identified as having a strong correlation in speech input sequences from a training corpus that represents the structure of expected speech inputs. A first trigger word has a strong statistical likelihood of being followed by a second trigger word in the trigger pair in speech input, although the words may be separated by an indeterminate number of intermediate words in different speech inputs. Thus, if a speech recognition result includes the trigger words, the likelihood of those trigger words in the speech recognition result being accurate is comparatively high due to the statistical correlation between the first and second trigger words. In the system 100, the trigger words 166 are generated based on a mutual information score using statistical methods that are known to the art. The memory 160 stores a predetermined set of N trigger pair elements in the feature vector that correspond to trigger pairs with high correlation levels between the first word and one or more subsequent words in the trigger word sequence based on sets of trigger words with high mutual information scores. As described below, the trigger word sequences 166 provide additional features of speech recognition results to the pairwise ranker 164 that enables the pairwise ranker 164 to rank the speech recognition results using additional features of the speech recognition results that go beyond the words that are present in the speech recognition result.

As described in additional detail below, the system 100 receives audio input data using the microphone 128 and uses the multiple speech engines 162 to generate a plurality of speech recognition results. The controller 148 also combines selected terms from the domain-specific speech recognition engine results with the speech engine results from the general-purpose speech engines to generate hybrid speech recognition results. The controller 148 uses the pairwise ranker 164 to rank the hybrid speech recognition results and use the highest ranked result to control the operation of the in-vehicle information system 100 or any other automated system in alternative embodiments. As part of the ranking process, the pairwise ranker 164 identifies the occurrences of the predetermined trigger pairs 166 in speech recognition results and generates a feature vector based on the identified trigger pairs to provide additional high-level linguistic information to the pairwise ranker 164.

While FIG. 1 depicts the in-vehicle information system 100 as an illustrative example of an automated system that performs speech recognition to receive and perform commands from a user, a similar speech recognition process can be implemented in other contexts. For example, a mobile electronic device such as the smartphone 170 or other suitable device typically includes one or more microphones and a processor that can implement the speech recognition engines, pairwise ranker, stored trigger pairs, and other components that implement a speech recognition and control system. In another embodiment, a home automation system controls HVAC and appliances in a house using at least one computing device that receives the speech input from the user and performs speech recognition using the multiple speech recognition engines to control the operation of various automated systems in the house. In each embodiment, the system is optionally configured to use different sets of domain-specific speech recognition engines that are tailored for the specific applications and operations of different automated systems.

Figure 2:
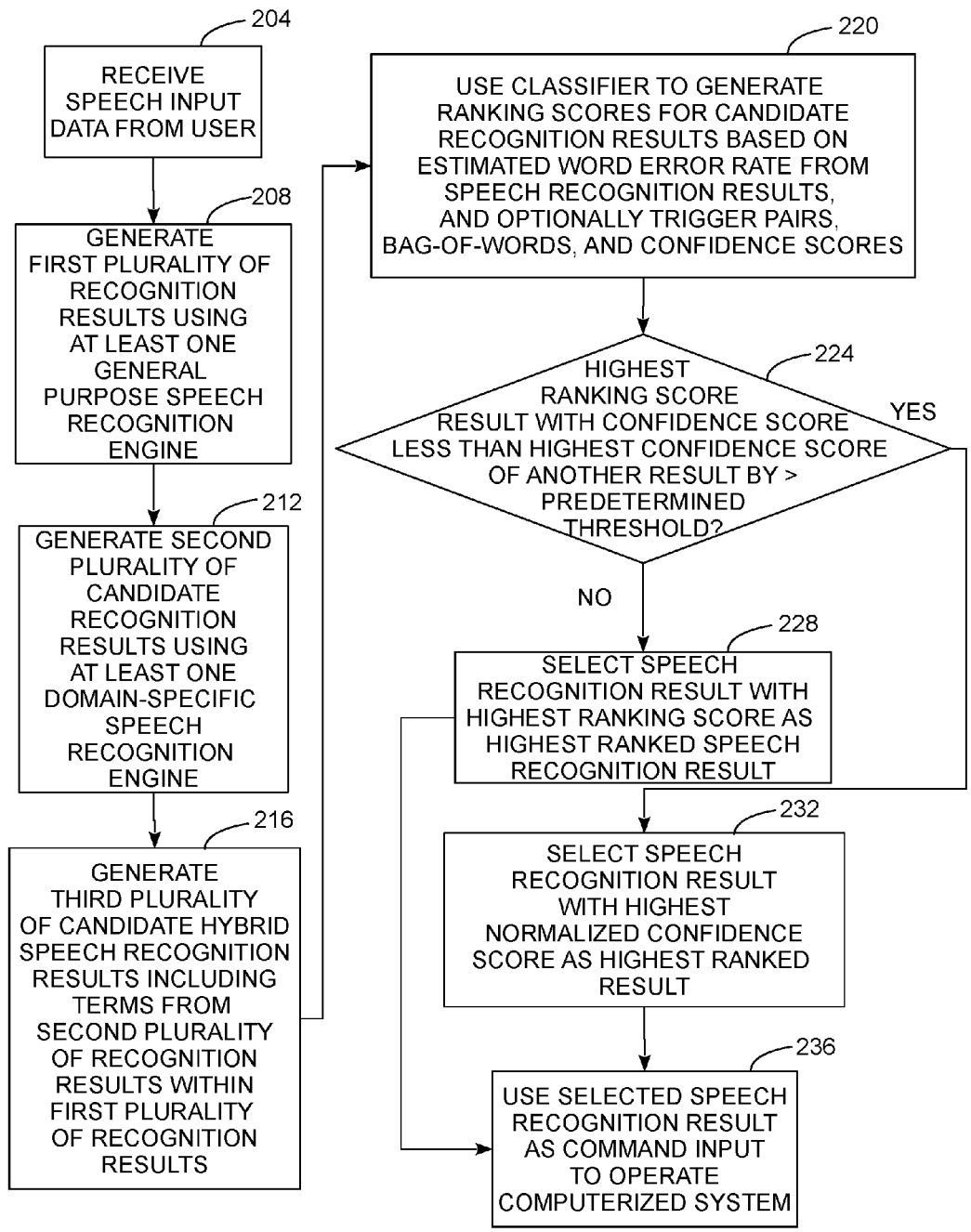
FIG. 2 is a block diagram of a process for performing speech recognition using

FIG. 2 depicts a process 200 for performing speech recognition using multiple speech recognition engines and a pairwise ranker. In the description below, a reference to the process 200 performing a function or action refers to the operation of a controller to execute stored program instructions to implement the function or action using one or more components of an automated system that receives command inputs via a speech recognition interface. The process 200 is described in conjunction with the system 100 of FIG. 1 for illustrative purposes.

Process 200 begins as the system 100 receives audio input data from a user (block 204). An audio input device, such as the microphone 128, generates audio input data corresponding to speech input from a user. The controller 148 receives the audio input data in a digital format and optionally performs filtering or other digital signal processing operations to remove noise from the audio input data.

The process 200 continues as the system 100 generates a first plurality of candidate speech recognition results corresponding to the audio input data using a first general-purpose speech recognition engine based on the audio input data (block 208). The system 100 also generates a second plurality of the candidate speech recognition results using at least one domain-specific speech recognition engine (block 212). In the system 100, the controller 148 uses one or more of the general-purpose speech recognition engines 162 to generate the first plurality of results and one or more of the domain-specific speech recognition engines 162 to generate the second plurality of candidate results. In some embodiments, the controller 148 selects a predetermined number of speech recognition results from each speech recognition engine that each speech recognition engine indicates have the highest confidence score values to form each plurality of speech recognition results. For example, in on embodiment the controller 148 generates five candidate speech recognition results with the highest confidence score values from each of the speech recognition engines 162. The generation of the first second pluralities of candidate speech recognition results occurs in any order or concurrently in embodiments of the controller 148 that include parallel processing hardware such as multiple processor cores.

The process 200 continues as the controller 148 generates a third plurality of candidate hybrid speech recognition results based on the first plurality of candidate speech recognition results and the second plurality of candidate speech recognition results (block 216). The third plurality of candidate speech recognition results are also referred to as hybrid speech recognition results since these results combine words from speech recognition results that are produced by two or more speech recognition engines. The controller 148 generates each speech recognition result in the third plurality of candidate speech recognition results including a plurality of words that are included in one of the first plurality of candidate speech recognition results from the general-purpose speech recognition and at least one word included in another one of the second plurality of candidate speech recognition results from the domain-specific speech recognition engines. The controller 148 identifies common words in the candidate speech recognition results of both the speech engines and substitutes words from the general-purpose speech engine result with corresponding words from the domain-specific speech engine result that differ from the general-purpose speech recognition results.

To generate the each candidate hybrid speech recognition result in the third plurality of speech recognition results the controller 148 first aligns common words in each of the speech recognition results using a technique that is known to the art such as using a dynamic programming process to align the words with a "minimum edit distance" that minimizes the differences between the word sequences. The controller 148 then selects words from the candidate speech recognition result of the domain-specific speech recognition engine that are aligned with different words in the first speech recognition result and substitutes those words into the candidate speech recognition result of the general-purpose speech recognition engine to produce the hybrid candidate speech recognition result in the third plurality of candidate speech recognition results. If the candidate speech recognition result from the domain-specific speech recognition engine includes domain-specific words $t_1, t_2, \ldots, t_k$, that do not appear in the corresponding candidate speech recognition result of the general purpose speech recognition engine, then the controller 148 substitutes permutations of the individual words and combinations of the individual words from the domain-specific speech recognition engine into the candidate speech recognition result from the general-purpose speech recognition engine to produce a plurality of candidate hybrid speech recognition results that include the permutations of different words from the domain-specific speech recognition engine.

Figure 4:
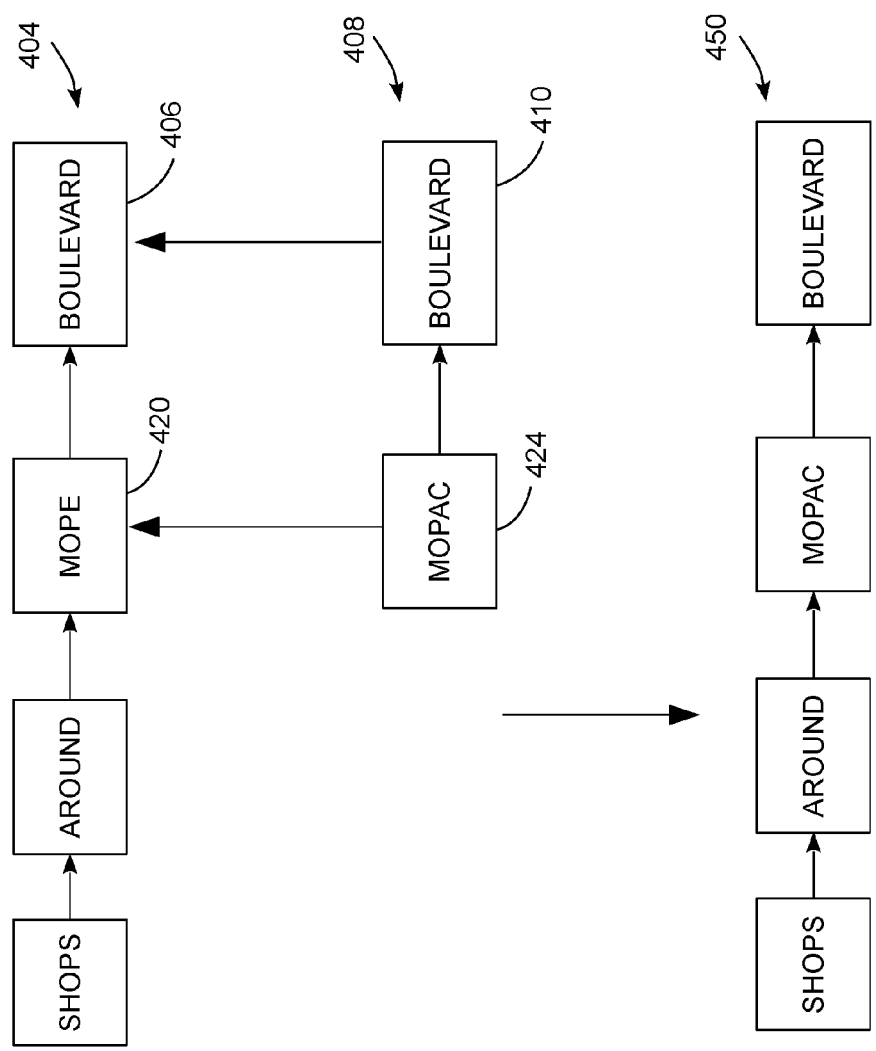
FIG. 4 is a diagram depicting two different speech recognition results for a single speech input and a hybrid speech recognition result that combines words from both of the speech recognition results.

FIG. 4 depicts an example of two candidate speech recognition results 404 and 408 and a hybrid candidate speech recognition result 450. In the example of FIG. 4 the speech input is based on a navigation request from a user to an in-vehicle navigation system. The general-purpose speech recognition engine generates the speech recognition result 404 based on a general English language model. The domain-specific speech recognition engine focuses on navigation and includes additional terms for road and place names that include terms that are not part of the official English language vocabulary. In the system 100, the controller 148 executes program code in the hybrid speech recognition result generation engine 163 to generate a hybrid speech recognition result using words from at least two speech recognition results generated by the general-purpose and domain-specific speech recognition engines 162. Each speech recognition result includes a sequence of words that forms a sentence. The controller 148 aligns the two speech recognition results 404 and 408 based on words that are common to both sequences, such as the example word "boulevard", which is shown as a common word 406 in the first speech recognition result and 410 in the second speech recognition result. The word "mope" 420 in the first speech recognition result 404 is aligned with the word "Mopac" 424 in the speech recognition result 408. The controller 148 then identifies words in the second speech recognition 408 from the domain-specific speech recognition engine that are not present in the aligned speech recognition results 404. In the example of FIG. 4, the term "Mopac" 424 in the second recognition result 404 is a colloquial term used to describe a major boulevard in Austin, Tex. that the domain-specific speech recognition engine recognizes in the audio input data. However, the general-purpose speech recognition engine misidentifies the word Mopac as "mope" since the general-purpose speech recognition engine is trained to recognize a broad range of English words. Furthermore, the second speech recognition result 408 includes a narrower set of terms since the domain-specific speech recognition engine does not directly recognize some of the words from the audio input data.

The controller 148 generates the hybrid candidate speech recognition output 450 using the words from the first candidate speech recognition result 404 as a basis and with the term "Mopac" substituted in to replace the word "mope" to incorporate the different terms from the second candidate speech recognition result 408. The controller 148 optionally replaces multiple terms from the speech recognition result of the general-purpose speech recognition engine with different words from the domain-specific speech recognition engine to form the hybrid speech recognition result. During process 200, the controller 148 performs the process described above for multiple sets of general-purpose speech recognition results and domain-specific speech recognition results to generate a third plurality of hybrid speech recognition results that include words from both one or more general-purpose speech recognition engines and domain-specific speech recognition engines.

In some embodiments, the controller 148 only substitutes words that have a specific semantic significance in the candidate speech recognition results of the domain-specific speech recognition engine into the speech recognition results of the general-purpose speech recognition engine. For example, in FIG. 4 the domain-specific speech recognition engine 162 is specifically trained to recognize street names and other geographic terms with a higher accuracy than a general-purpose speech recognition engine. Thus, the controller 148 substitutes the word "mope" with "Mopac" in FIG. 4 since the term "Mopac" has semantic significance as the name of a road in the domain-specific speech recognition engine. However, if the domain-specific speech recognition engine generates a different result for another word, such as a commonly used English verb or pronoun, then the controller 148 continues to rely on the results from the general-purpose speech recognition engine, which arguably produces more accurate results for more typical natural language patterns. The controller 148 identifies the semantic classifications of particular words based on information from the language model in each of the speech recognition engines 162.

During the process 200, the controller 148 also uses the hybrid speech recognition result generation engine 163 to produce a confidence score for each candidate hybrid speech recognition result. In the system 100, the controller 148 generates an average value of the confidence scores from the speech recognition results of the general-purpose and domain-specific speech recognition engines 162 as the confidence value for the hybrid speech recognition result. As is described in more detail below, the controller 148 uses a linear regression process to normalize the confidence scores of two or more different speech recognition engines and in one embodiment the controller 148 normalizes the confidence scores from the original speech recognition results that form the basis of the hybrid speech recognition result to generate the confidence score for the hybrid speech recognition result. During the process 200, the pairwise ranker 164 receives the normalized confidence score for the hybrid speech recognition result as one feature in an input feature vector to rank pairs of the candidate speech recognition results.

Referring again to FIG. 2, the process 200 continues as the controller 148 uses the pairwise ranker 164 to generate ranking scores for the third plurality of candidate hybrid speech results recognition results based on estimated word error rate from speech recognition results and optionally identified word trigger pairs and bag-of-words features in the speech recognition results, and confidence scores for the speech recognition results (block 220). As noted above, the controller 148 uses the pairwise ranker 164 to rank the speech recognition results using a pairwise process in which the pairwise ranker 164 receives two speech recognition results and identifies a "winning" result as the speech recognition result with a lowest estimated word error rate in the pair. Additionally, in some embodiments the system 100 ranks some or all of the first plurality of candidate speech recognition results from the general-purpose speech recognition engine or the second plurality of candidate speech recognition results from the domain-specific speech recognition engines, or both of the first and second pluralities, in addition to the third plurality of candidate hybrid speech recognition results.

In the system 100, the pairwise ranker 164 is a random forest ranking system that receives two speech recognition results as inputs and ranks the pair of speech recognition based on an estimated word error rate for each speech recognition result where a lower estimated word error rate produces a higher rank. During the process 200, the controller 148 supplies each pair combination of speech recognition results to the pairwise ranker 164 to determine the relative ranks of different pairs of speech recognition results. The controller 148 increments a ranking score that is associated with either a first or second candidate speech recognition result that "wins" each comparison with the pairwise ranker in having the lowest estimated word error rate. The controller 148 then identifies the highest rank result as the candidate speech recognition result that has the highest ranking score after the pairwise ranker 164 identifies the lowest word error rate between each pair of speech recognition results.

During operation, the pairwise ranker 164 receives the speech recognition results in a predetermined feature vector format and the trained random forest model in the pairwise ranker generates estimates of the word error rate in each speech recognition result based on the words in each speech recognition result, the structure of the words, and the identity of the speech recognition engine that produced each speech recognition result. In particular, in configurations of the system 100 that use more than one general-purpose or special purpose speech recognition engine, the trained random forest pairwise ranker can generate different estimates for word error rates based on the identity of the speech recognition engine that generated each speech recognition result since, for example, some speech recognition engines are more accurate when identifying specific sets of words or phrases. The pairwise ranker 164 is trained to estimate the word error rates based on the observed rates of word errors from each of the speech recognition engines 162 based on a set of predetermined training data during a training process that occurs prior to the process 200. As is described in more detail below, in addition to ranking the speech recognition results based on the actual contents of each result, the pairwise ranker 164 optionally uses word trigger pairs, candidate speech recognition result confidence score values, and bag-of-words with decay features that are associated with the feature vectors of the candidate speech recognition results to estimate the lowest word error rate and produce rankings for each pair of candidate speech recognition results.

Figure 3:
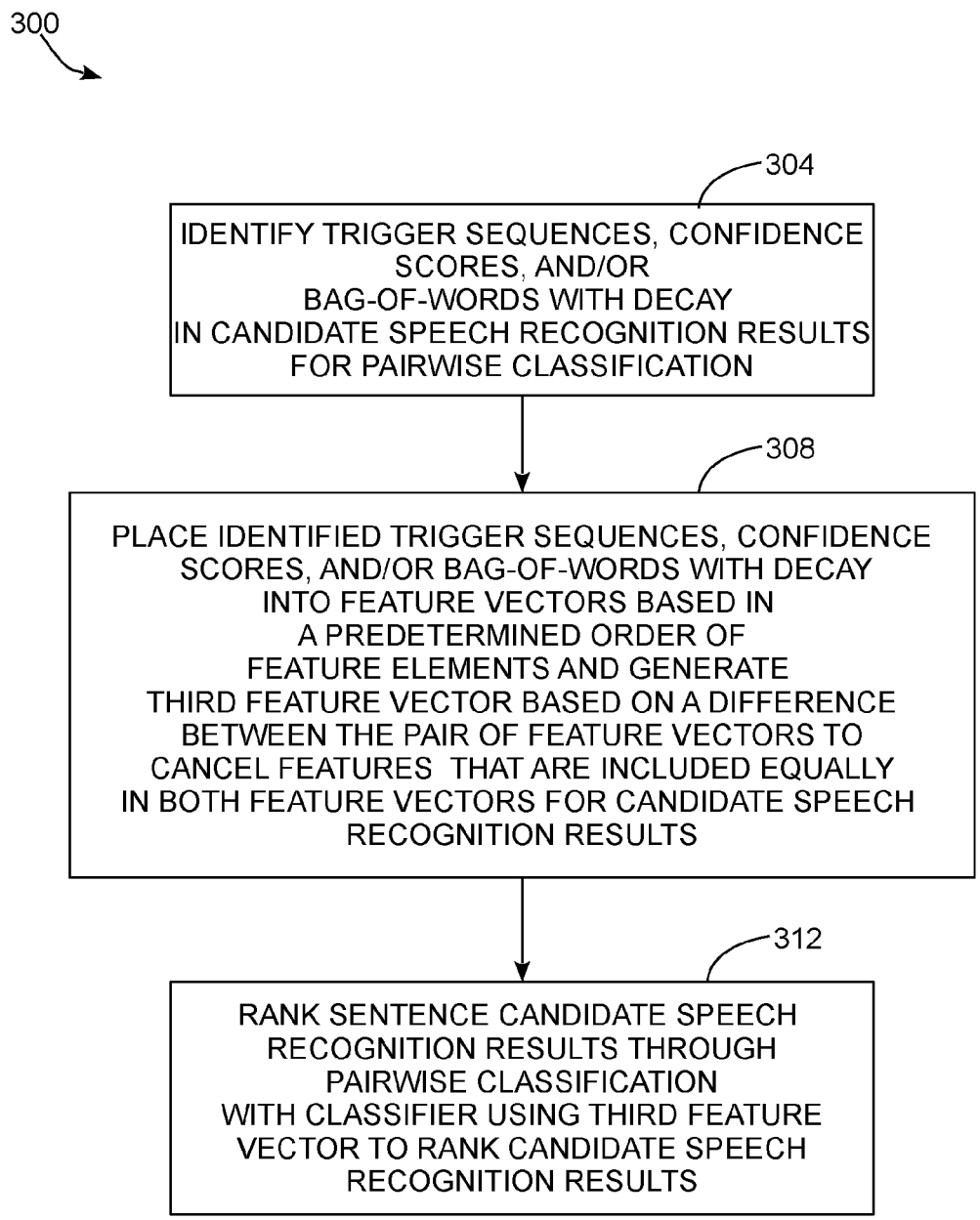
FIG. 3 is a block diagram of a process for generating feature vectors based on trigger word sequences in speech recognition results.

FIG. 3 depicts a process 300 for generation of a feature vector corresponding to trigger pairs that are present in one or more of the speech recognition results. In the description below, a reference to the process 300 performing a function or action refers to the operation of a controller to execute stored program instructions to implement the function or action using one or more components of an automated system that receives command inputs via a speech recognition interface. The process 300 is described in conjunction with the system 100 of FIG. 1 and process 200 of FIG. 2 for illustrative purposes.

The process 300 begins as the controller 148 identifies features including at least one of the trigger pairs, confidence cores, and bag-of-words with decay features in the text data corresponding to a pair of candidate speech recognition results (block 304). For example, using the example speech recognition result 450 of FIG. 4, if one of the trigger word sequences 166 that are stored in the memory 160 includes the trigger pair ("Shops", "around") then the controller 148 identifies the word "Shops" as being a first trigger term in the trigger pair and parses any subsequent words in the speech recognition result to identify additional words in the trigger pair such as the word "around". In some instances, the controller 148 identifies multiple sets of trigger word sequences in a single speech recognition result.

The process 300 continues as the controller 148 generates a feature vector that includes values for each of the trigger pairs, confidence scores, and the bag-of-words with decay features that are identified in the speech recognition result (block 308). The controller 148 generates a feature vector with a predetermined number of N elements that each correspond to one of the N trigger word sequences 166 that are stored in the memory 160. Thus, each index in the feature vector corresponds to one trigger phrase in a consistent manner between multiple speech recognition results. In a typical instance most (sometimes all) of the trigger word sequences are not present in the speech recognition results and the controller 148 optionally generates the feature vector as a sparse vector that only includes non-trivial entries for the trigger word sequences that are actually present within the speech recognition result.

In the pairwise ranking process, the controller 148 cancels out the occurrence of each trigger pair in two feature vectors that both include the same trigger pair. For example, if both candidate speech recognition results include the trigger pair ("Shops", "around"), then the controller 148 removes this entry from the feature vector of both candidate speech recognition results because the trigger pair occurs in both candidate results and is effectively canceled out in a pairwise comparison process. However, if only one candidate result includes the trigger pair, then the feature vector for that candidate result includes a value to indicate that the trigger pair is only present in that candidate speech recognition result. The controller 148 then generates an input feature vector for the pairwise ranker 164 that corresponds to the pair of candidate speech recognition results based on a difference between the two feature vectors of the two candidate results. During process 200 the controller 148 generates a third feature vector based on the first feature vector and the second feature vector for each pairwise comparison. The third feature vector forms the input to the pairwise ranker 164 that includes encoded differences between the results of the two original feature vectors. The third feature vector includes negative values and positive values that enable the pairwise ranker 164 to identify the particular speech recognition result that includes each feature. For example, using a simplified feature vector array corresponding to trigger pairs, bag-of-words with decay values, confidence scores, or other features, the first candidate speech recognition result includes [0, 0, 1, 1, 0, 0], the second candidate speech recognition result includes [0, 1, 1, 0, 0, 0] and the controller 148 generates the final speech recognition result for the pairwise ranker 164 based on the second feature vector being subtracted from the first feature vector: [0, −1, 0, 1, 0, 0]. In this example, the negative values indicate a feature is present in only the second feature vector or that the second feature vector has a higher numeric feature value for a given feature. In the example above the third indexed value for both the first and second feature vectors is "1" and the final feature vector includes the trivial value "0" in the third index since both input feature vectors include the same feature, which the pairwise ranker 164 ignores since the feature does not distinguish between the two candidate speech recognition results.

In some embodiments, the controller 148 identifies the frequency of the occurrence of each trigger pair in each pair of candidate speech recognition results. If the candidate speech recognition results each include the same trigger pair that occurs with the same frequency, then the controller 148 removes the trigger pair from the feature vectors of both candidate speech recognition results since the occurrence of the trigger pair provides no additional information for the pairwise ranker 164 to perform the ranking process. If, however, one of the candidate speech recognition results includes the trigger pair more often than the other speech recognition result in the pair, then the controller 148 includes the difference in frequency as the value corresponding to the trigger phrase in the final feature vector generated for the pair of candidate speech recognition results.

Process 300 concludes as the controller 148 uses the feature vector data corresponding to the trigger word pairs, confidence scores, and the bag-of-words with decay features as part of the process for ranking the speech recognition results as is described above with reference to the processing of block 220 in FIG. 2 (block 312). During the process 200, the controller 148 performs the process 300 to generate the additional feature vector data for each of the speech recognition results. The controller 148 uses the pairwise ranker 164 to estimate the word error rate in each speech recognition result based at least in part on the feature vector, which encodes additional information about the relationships between non-adjacent words in a trigger pair. The additional information in the feature vector encodes higher level linguistic features about trigger word sequences that typically do not include adjacent words in a sentence to the pairwise ranker 164, which improves the accuracy of the ranking process.

In addition to generating the feature vector for each candidate speech recognition result including trigger pair elements, the pairwise ranker 164 optionally adds "bag-of-words with decay" features, that are computed based on the candidate sentence hypotheses, to the feature vector. The term "bag-of-words with decay" feature as used herein refers to a numeric score that the controller 148 assigns to each word that is present in the candidate speech recognition results based on the position of the word within the result and how often the word occurs. The controller 148 generates the bag-of-words with decay score for each recognized dictionary word that is present in the candidate speech recognition result. In the system 100, the dictionary data are stored in association with, for example, the speech recognition engine model data 162 in the memory 160. For a given word $w_i$ in a predetermined dictionary the bag of words with decay score is: $bow_i = \Sigma_{p \in P'(w_i)} \gamma^p$ where $P'(w_i)$ is the set of positions in the candidate speech recognition result where the word $w_i$ occurs and the term $\gamma$ is a predetermined numeric decay factor in a range of (0, 1.0) that is, for example, set to 0.9 in the illustrative embodiment of the system 100.

During the process 200, the controller 148 generates the feature vector including the bag-of-words with decay values to either supplement or replace the feature vector values that indicate the presence or absence of each word from a predetermined dictionary in the candidate speech recognition results. In a similar manner to the trigger pair feature vector values, the controller 148 generates the individual bag-of-words with decay feature values for each candidate speech recognition result in the pair and subsequently generates the difference between the two feature vectors as the final feature vector values that are provided to the pairwise ranker 164. Consequently, the controller 148 generates a feature vector with a non-trivial entry for a word only if the two speech recognition results in the pair have different bag of words with decay scores for that word, and includes a zero-value feature vector entry for each word that either not appears in each of the two candidate speech recognition results in the pair or has the same bag of words with decay scores for both of the candidate speech recognition results in the pair.

In addition to generating the feature vector for each pair of candidate speech recognition results including trigger pair elements and bag-of-words with decay features, the pairwise ranker 164 optionally adds confidence score features as one additional feature in the feature vector that is provided to the pairwise ranker. The confidence score feature is computed as the difference between the confidence scores of the two speech recognition results in the pair.

Referring again to FIG. 2, the process 200 generates the ranking scores for each pair of the third plurality of candidate hybrid speech recognition results based on the feature vector inputs that are described above. In some configurations, the controller 148 also generates ranking scores for either or both of the first plurality of speech recognition results from the general-purpose speech recognition engines and the second plurality of speech recognition results from the domain-specific speech recognition engines.

In the embodiment of FIG. 2, the ranking scores that are generated for each of the speech recognition results are not the only metric that the controller 148 uses to identify the highest ranked speech recognition result. The controller 148 also uses the confidence scores that each of the speech recognition engines generates in association with each speech recognition result, including the hybrid speech recognition results, in the ranking process. During process 200, the controller 148 identifies the candidate speech recognition result with the highest confidence score and compares the highest confidence score to the confidence score of the speech recognition result with the highest ranking score. If the confidence score of the candidate speech recognition result with the highest ranking score is within a predetermined threshold range of the highest overall confidence score (block 224) then the controller 148 selects the candidate speech recognition result with the highest ranking score as the highest ranked output speech recognition result selected from the candidate speech recognition results (block 228). For example, if the difference in confidence scores is within 15% on a normalized confidence score range that is described in more detail below, then the controller 148 selects the speech recognition result with the highest ranking score as the overall highest ranked speech recognition result. If, however, the highest confidence score of the other speech recognition result exceeds the confidence score of the speech recognition result with the highest ranking score by more than the predetermined threshold (block 224) then the controller 148 selects the speech recognition result with the highest confidence score as the output speech recognition result (block 232). In an alternative embodiment to the processing that is depicted in blocks 224-232, the controller 148 selects the candidate speech recognition result with the highest ranking score as the final output speech recognition result without performing additional processing to compare the confidence scores of the candidate speech recognition results.

Of course, in many instances the confidence score of the speech recognition result with the highest ranking score is also the highest confidence score or a very high confidence score amongst all of the speech recognition results and the controller 148 identifies the speech recognition result with the highest ranking score as the highest rank speech recognition result. In other situations, however, the controller 148 selects the speech recognition result with the highest confidence score if the speech recognition result with the highest ranking score has a much lower confidence score. In another configuration, the controller 148 combines the ranking score and the confidence score into a composite score to identify the highest ranked speech recognition result. For example, in some situations a speech recognition result may have a high ranking score and a high confidence score but may not have the highest ranking score or confidence score amongst all of the speech recognition results. The controller 148 identifies the speech recognition result as having the highest ranking using a composite score such as a weighted average or other combination of the ranking score and confidence score.

As described above, the controller 148 identifies the highest ranked speech recognition result based in part upon the confidence scores that are associated with each speech recognition result. The confidence scores are statistical values of an estimate of accuracy (confidence) for each speech recognition result that the speech recognition engines 162 generate in association with the speech recognition results. However, the numeric confidence score ranges for one speech recognition engine typically do not translate to another speech recognition engine, which increases the difficulty of comparing the confidence scores of speech recognition results from multiple speech recognition engines. For example, a first speech recognition engine A generates confidence scores on a scale of 1-100 while a second speech recognition engine B generates confidence scores on a scale of 1-1000. However, merely scaling the numerical results of engine A to match the range of confidence scores in engine B or vice versa is insufficient to make the confidence scores comparable. That is because the actual estimate of accuracy that corresponds to a particular confidence score is typically not the same between two different speech recognition engines. For example, an arbitrary confidence score of 330 on a normalized scale for engine A could correspond to an estimated accuracy of 75% but the same score for engine B could correspond to an estimated accuracy of 84%, which can be a substantial difference given the range of accuracy levels that are expected in high quality speech recognition engines.

In the system 100, the controller 148 normalizes the confidence scores between different speech recognition engines using a linear regression process. The controller 148 first subdivides the confidence score ranges into a predetermined number of subdivisions or "bins", such as twenty unique bins for the two speech recognition engines A and B. The controller 148 then identifies the actual accuracy rates for various speech recognition results that correspond to each bin of scores based on the observed speech recognition results and the actual underlying inputs that were used during the training process prior to the process 200. The controller 148 performs a clustering operation of the confidence scores within predetermined numeric windows around "edges" that separate bins for each set of results from the different speech recognition engines and identifies an average accuracy score that corresponds to each edge confidence score value. The "edge" confidence scores are uniformly distributed along the confidence score range of each speech recognition engine and provide a predetermined number of comparison points to perform a linear regression that maps the confidence scores of a first speech recognition engine to confidence scores of another speech recognition engine that have similar accuracy rates. The controller 148 uses the identified accuracy data for each edge score to perform a linear regression mapping that enables the controller 148 to convert a confidence score from a first speech recognition engine to another confidence score value that corresponds to an equivalent confidence score from a second speech recognition engine. The mapping of one confidence score from a first speech recognition engine to another confidence score from another speech recognition is also referred to as a score alignment process and in some embodiments the controller 148 determines an alignment of a confidence score from a first speech recognition engine with a second speech recognition engine using the following equation:

$$x' = e'_i + \frac{(x - e_i)}{(e_{i+1} - e_i)}(e'_{i+1} - e'_i)$$

Where x is the score from the first speech recognition engine, x' is the equivalent value of x within the confidence score range of the second speech recognition engine, the values $e_i$ and $e_{i+1}$ correspond to the estimated accuracy scores for different edge values that are nearest to the value x_for the first speech recognition engine (e.g. the estimated accuracy scores for edge values 20 and 25 around a confidence score of 22) and the values $e_i'$ and $e_{i+1}'$ correspond to the estimated accuracy scores at the same relative edge values for the second speech recognition engine.

In some embodiments, the controller 148 stores the results of the linear regression in the memory 160 as a lookup table or other suitable data structure to enable efficient normalization of confidence scores between the different speech recognition engines 162 without having to regenerate the linear regression for each comparison.

Referring again to FIG. 2, process 200 continues as the controller 148 uses the selected highest ranked speech recognition result as input from the user to control the automated system (block 236). In the in-vehicle information system 100 of FIG. 1, the controller 148 operates various systems including, for example, a vehicle navigation system that uses the GPS 152, wireless network device 154, and LCD display 124 or HUD 120 to perform vehicle navigation operations in response to the speech input from the user. In another configuration, the controller 148 plays music through the audio output device 132 in response to the speech command. In still another configuration, the system 100 uses the smartphone 170 or another network connected device to place a hands-free phone call or transmit a text message based on the speech input from the user. While FIG. 1 depicts an in-vehicle information system embodiment, other embodiments employ automated systems that use the audio input data to control the operation of various hardware components and software applications.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method for speech recognition in an automated system comprising:
generating, with an audio input device, audio input data corresponding to speech input from a user;
generating, with a controller, a first plurality of candidate speech recognition results corresponding to the audio input data using a first general-purpose speech recognition engine;
generating, with the controller, a second plurality of candidate speech recognition results corresponding to the audio input data using a first domain-specific speech recognition engine;
generating, with the controller, a third plurality of candidate speech recognition results, each candidate speech recognition result in the third plurality of candidate speech recognition results including a plurality of words included in one of the first plurality of candidate speech recognition results and at least one word included in another one of the second plurality of candidate speech recognition results;
ranking, with the controller, at least the third plurality of candidate speech recognition results using a pairwise ranker to identify a highest ranked candidate speech recognition result, identifying the highest-ranked candidate speech recognition result based on a ranking score using a pairwise ranking process between a plurality of pairs of candidate speech recognition results selected from the third plurality of candidate speech recognition results using the pairwise ranker, the identifying further comprising:
generating, with the controller, a first feature vector including a feature corresponding to a bag-of-words with decay value corresponding to at least one word in the first candidate speech recognition result;
generating, with the controller, a second feature vector, the first feature vector including a feature corresponding to a bag-of-words with decay value corresponding to at least one word in the second candidate speech recognition result;
generating, with the controller, a third feature vector based on a difference between the first feature vector and the second feature vector;
estimating, with the controller, the first word error rate in the first candidate speech recognition result and the second word error rate in the second candidate speech recognition result based on the third feature vector using a pairwise ranker;
incrementing, with the controller, a ranking score associated with the first candidate speech recognition result in response to the first word error rate being less than the second word error rate; and
incrementing, with the controller, another ranking score associated with the second candidate speech recognition result in response to the first word error rate being greater than the second word error rate; and operating, with the controller, the automated system using the highest ranked candidate speech recognition result as an input from the user.

2. The method of claim 1, the generating of at least one candidate speech recognition result in the third plurality of candidate speech recognition results further comprising:
identifying, with the controller, a first word in a first plurality of words of a first candidate speech recognition result in the first plurality of candidate speech recognition results that corresponds to a second word in a second plurality of words in a second candidate speech recognition result in the second plurality of candidate speech recognition results, the second word being different than the first word; and
generating, with the controller, the candidate speech recognition result for the third plurality of candidate speech recognition results including the first plurality of words from the first candidate speech recognition result with the second word from the second candidate speech recognition result replacing the first word from the first candidate speech recognition result.

3. The method of claim 2 further comprising:
aligning, with the controller, the second plurality of words in the second candidate speech recognition result with the first plurality of words in the first candidate speech recognition result based on a position of at least one word in the second plurality of words that is also present in the first plurality of words; and
identifying, with the controller, the first word in the first plurality of words of the first candidate speech recognition result in the first plurality of speech recognition that corresponds to the second word in the second plurality of words in a second candidate speech recognition result at a word position in the first plurality of words that is aligned with the second plurality of words.

4. The method of claim 1, the ranking further comprising:
identifying, with the controller, the highest ranked candidate speech recognition result as one candidate speech recognition result in the third plurality of candidate speech recognition results having the highest ranking score.

5. The method of claim 1, the ranking further comprising:
ranking, with the controller, the first plurality of candidate speech recognition results and the third plurality of candidate speech recognition results using the pairwise ranker to identify the highest ranked candidate speech recognition result.

6. An automated system with speech input control comprising:
an audio input device configured to generate audio input data corresponding to speech input from a user; and
a controller operatively connected to the audio input device and a memory, the controller being configured to:
receive the audio input data from the audio input device;
generate a first plurality of candidate speech recognition results corresponding to the audio input data using a first general-purpose speech recognition engine;
generate a second plurality of candidate speech recognition results corresponding to the audio input data using a first domain-specific speech recognition engine;
generate a third plurality of candidate speech recognition results, each candidate speech recognition result in the third plurality of candidate speech recognition results including a plurality of words included in one of the first plurality of candidate speech recognition results and at least one word included in another one of the second plurality of candidate speech recognition results;
rank at least the third plurality of candidate speech recognition results using a pairwise ranker to identify a highest ranked candidate speech recognition result, the controller being further configured to:
identify the highest ranked candidate speech recognition result based on a ranking score using a pairwise ranking process between a plurality of pairs of candidate speech recognition results selected from the third plurality of candidate speech recognition results using the pairwise ranker, the ranking of each pair of candidate speech recognition results further comprises the controller being configured to:
generate a first feature vector including a feature corresponding to a bag-of-words with decay value corresponding to at least one word in the first candidate speech recognition result;
generate a second feature vector, the first feature vector including a feature corresponding to a bag-of-words with decay value corresponding to at least one word in the second candidate speech recognition result;
generate a third feature vector based on a difference between the first feature vector and the second feature vector; and
estimate a first word error rate in the first candidate speech recognition result and a second word error rate in the second candidate speech recognition result based on the third feature vector using the pairwise ranker;
increment a ranking score associated with the first candidate speech recognition result in response to the first word error rate being less than the second word error rate; and
increment another ranking score associated with the second candidate speech recognition result in response to the first word error rate being greater than the second word error rate; and
operate the automated system using the highest ranked candidate speech recognition result as an input from the user.

7. The automated system of claim 6, the controller being further configured to:
identify a first word in a first plurality of words of a first candidate speech recognition result in the first plurality of candidate speech recognition results that corresponds to a second word in a second plurality of words in a second candidate speech recognition result in the second plurality of candidate speech recognition results, the second word being different than the first word; and
generate the candidate speech recognition result for the third plurality of candidate speech recognition results including the first plurality of words from the first candidate speech recognition result with the second word from the second candidate speech recognition result replacing the first word from the first candidate speech recognition result.

8. The automated system of claim 7, the controller being further configured to:
align the second plurality of words in the second candidate speech recognition result with the first plurality of words in the first candidate speech recognition result based on a position of at least one word in the second plurality of words that is also present in the first plurality of words; and identify the first word in the first plurality of words of the first candidate speech recognition result in the first plurality of candidate speech recognition that corresponds to the second word in the second plurality of words in a second candidate speech recognition result at a word position in the first plurality of words that is aligned with the second plurality of words.

9. The automated system of claim 6, the controller being further configured to:

identify the highest ranked candidate speech recognition result as one candidate speech recognition result in the third plurality of speech recognition results having the highest ranking score.

10. The automated system of claim 6, the controller being further configured to:

rank the first plurality of candidate speech recognition results and the third plurality of candidate speech recognition results using the pairwise ranker to identify the highest ranked candidate speech recognition result.

* * * * *